United States Patent [19]

Brown et al.

[11] Patent Number: 5,287,522
[45] Date of Patent: Feb. 15, 1994

[54] EXTERNAL PROCEDURE INVOCATION APPARATUS UTILIZING INTERNAL BRANCH VECTOR INTERRUPTS AND VECTOR ADDRESS GENERATION, IN A RISC CHIP

[75] Inventors: Richard P. Brown, Acton; Thomas F. Joyce, Westford, both of Mass.; Steven S. Smith, Nashua, N.H.

[73] Assignee: Bull HN Information Systems, Inc., Billerica, Mass.

[21] Appl. No.: 546,347

[22] Filed: Jun. 29, 1990

[51] Int. Cl.⁵ .................... G06F 13/14; G06F 9/00
[52] U.S. Cl. ........................ 395/725; 395/375; 364/232.21; 364/242.1; 364/243.42; 364/243.41; 364/243; 364/261.3; 364/262.4; 364/263.2; 364/DIG. 1
[58] Field of Search ............... 364/DIG. 1, DIG. 2; 395/375, 425, 725

[56] References Cited

U.S. PATENT DOCUMENTS

| | | | |
|---|---|---|---|
| 4,608,660 | 8/1986 | Hasebe | 364/768 |
| 4,646,260 | 2/1987 | Chasse et al. | 395/725 |
| 4,669,057 | 5/1987 | Clark, Jr. et al. | 395/725 |
| 4,709,324 | 11/1987 | Kloker | 395/725 |
| 4,930,068 | 5/1990 | Katayose et al. | 395/725 |
| 4,933,835 | 6/1990 | Sachs et al. | 395/425 |
| 5,050,068 | 9/1991 | Dollas et al. | 395/375 |
| 5,125,092 | 6/1992 | Prener | 395/725 |
| 5,136,696 | 8/1992 | Beckwith et al. | 395/375 |
| 5,148,544 | 9/1992 | Cutler et al. | 395/725 |
| 5,197,138 | 3/1993 | Hobbs et al. | 395/375 |

Primary Examiner—Thomas C. Lee
Assistant Examiner—Maria N. Von Buhr
Attorney, Agent, or Firm—Faith F. Driscoll; John S. Solakian

[57] ABSTRACT

A system includes first and second processing units which are interconnected by a bidirectional bus. The first processing unit is a microprocessor chip programmed for executing procedures stored in an on-chip instruction cache unit. The second processing unit receives requests from an external source such as a system bus. The microprocessor chip includes a branch vector facility which connects to the bus. The second processing unit in response to an external request, generates a vector branch address. The processing unit transfers the vector branch address to the branch vector facility for storage along with setting a write indicator. The microprocessor chip, upon detecting that the write indicator was set, branches to the procedure specified by the branch vector address for executing the instructions of the procedure to carry out those operations required for processing the external request or event.

14 Claims, 3 Drawing Sheets

EXTERNAL PROCEDURE INVOCATION APPARATUS UTILIZING INTERNAL BRANCH VECTOR INTERRUPTS AND VECTOR ADDRESS GENERATION, IN A RISC CHIP

RELATED APPLICATION

1. The patent application of Steven S. Smith, Arnold J. Smith, Amy E. Gilfeather, Richard P. Brown and Thomas F. Joyce entitled, "A High Performance Pipelined Emulator," filed on even date with the subject patent application, bearing Ser. No. 07/546,348, pending, which is assigned to the same assignee as this patent application.

BACKGROUND OF THE INVENTION

1. Field of Use

The present invention relates to systems for processing requests and more particularly to apparatus for controlling the internal operations of a computer in response to external requests.

2. Prior Art

With the advent of high performance microprocessors, it becomes important to speed up as much as possible memory data transfers to maintain maximum throughput. This is particularly important in the case of modern reduced instruction set (RISC) microprocessors which rely on efficient instruction execution through several pipeline stages. In RISC processors, the only memory operations permitted are loads and stores. The load/store architecture is intended to simplify the design of the processor and allow the program to hide or mask the delay caused by memory accesses.

To reduce memory load delays, certain RISC chips include on-chip instruction and data caches. An example of one such chip is the Intel i860 microprocessor manufactured by Intel Corporation. Another approach has been to rearrange the sequence of instructions so that a useful instruction which does not depend on load data is placed in the time slot following the load instruction (i.e., called the load-delay slot).

While the above approaches reduce internal delays, they are not suitable for reducing overhead normally associated with the handling of external activity. To facilitate such processing, either normally substantial architectural changes must be made to such RISC microprocessors or externally created jump commands without architectural changes must be employed which require substantial time for execution.

Accordingly, it is a primary object of providing a technique for reducing overhead processing in high performance microprocessor chips.

It is a further object of the present invention to provide for reduced overhead without having to change the basic architecture of the high performance microprocessor chip.

SUMMARY OF THE INVENTION

The above objects and advantages are achieved in a preferred embodiment of the apparatus of the present invention which includes first and second processing chips which are interconnected through a bidirectional bus. The first processing unit is a high performance microprocessor chip programmed for executing procedures from an on-chip instruction cache unit. The second processing unit is an interface chip which connects to a system or I/O bus for receiving external requests requiring action by the first processing unit. The microprocessor chip further includes a branch vector facility which connects to the bidirectional bus.

In response to certain external requests, the first processing unit generates a vector branch address which it transfers via the bidirectional bus to the branch vector facility for storage. Also, the interface chip sets a write indicator signaling the storage of the vector branch address. When the microprocessor chip encounters a branch vector instruction and detects that the write indicator was set, it branches to the procedure specified by the stored vector branch address for executing the instructions of the procedure to carry out those operations for processing the external request or event. At that time, the microprocessor chip sets a read indicator signaling that the interface chip can load a new vector branch address for processing another external request. Before transferring each new branch vector address, the first processing unit tests the state of the read indicator for determining that the microprocessor chip had accessed the previously loaded branch vector address, thereby ensuring that it is not overwritten.

The above arrangement provides an efficient mechanism for externally controlling the execution of internal procedures by the microprocessor chip. This has particular application where the microprocessor chip is a reduced instruction (RISC) chip as in the case of the preferred embodiment. The invention eliminates the need for having the microprocessor chip develop vector addresses for referencing procedures in response to external requests or events by having to perform off-chip external memory load operations.

An example of how the apparatus of the present invention is used in an emulator is disclosed in the referenced related patent application. The apparatus of the present invention also has application in performing polling operations and in processing interrupt requests utilizing the standard interrupt facilities of the RISC microprocessor chip.

The novel features which are believed to be characteristic of the invention, both as to its organization and method of operation, together with further objects and advantages of the present invention, will be better understood from the following detailed description taken in conjunction with the accompanying drawings.

DETAILED DESCRIPTION OF THE PREFERRED EMBODIMENT

Figure 1:
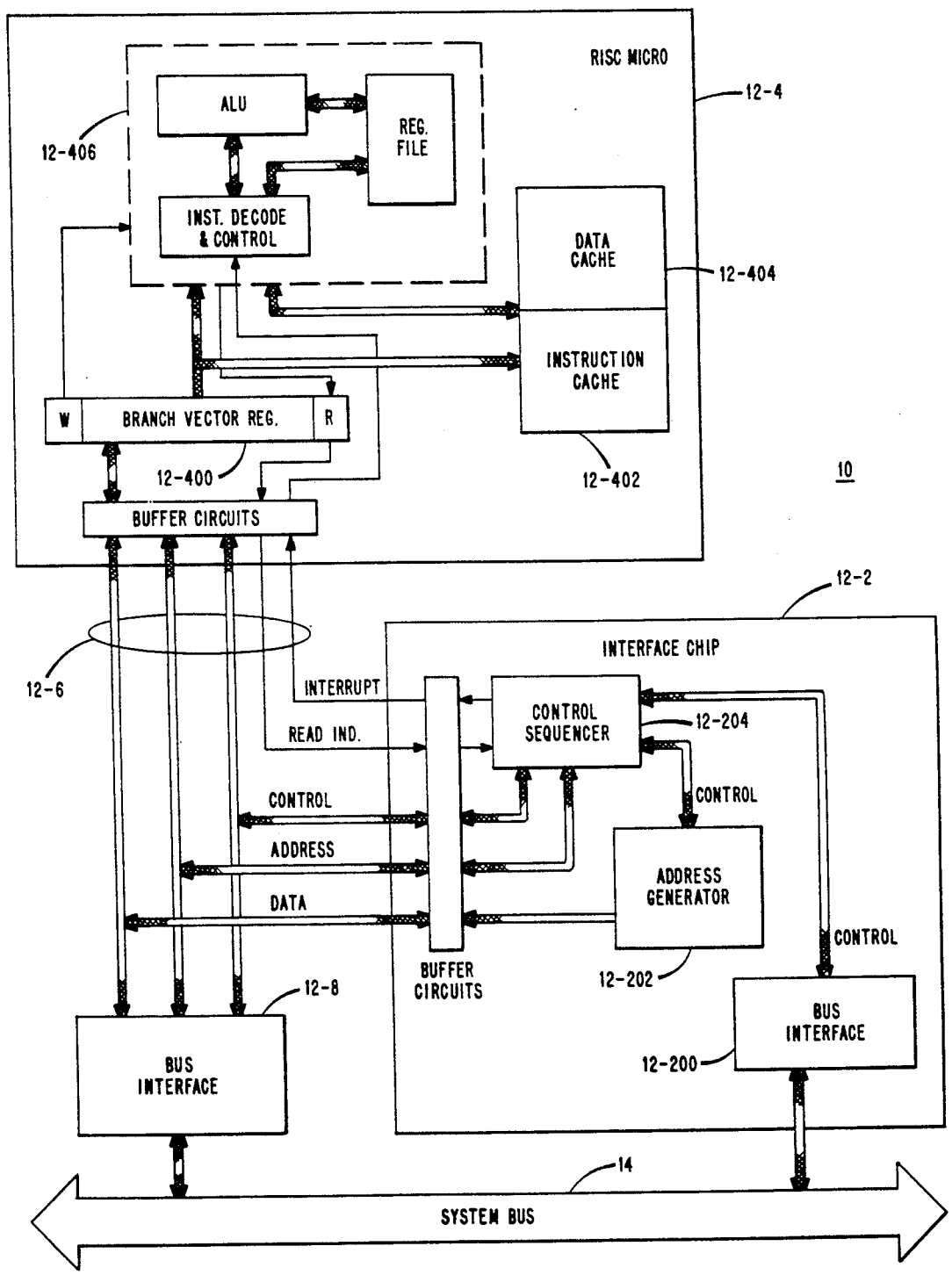
FIG. 1 is a block diagram of a system which is constructed using the principles of the present invention.

FIG. 1 shows in block diagram form, a data processing system 10, constructed according to the teachings of the present invention. As shown, the system 10 includes first and second processing units which correspond to an interface chip 12-2 and a microprocessor chip 12-4. The chips 12-2 and 12-4 are interconnected to communicate through the same bidirectional bus 12-6 which also provides a main memory access path to a system bus 14 through a bus interface unit 12-8.

The interface chip 12-2 couples to system bus 14 via bus interface unit 12-200 for receiving requests from devices (not shown) connected to system bus 14. In response to each request, chip 12-2 generates a branch vector address which specifies the procedure containing the required instructions for carrying out those operations for processing the request.

The chip 12-2, as shown, includes a control sequencer 12-204 for decoding each request received through a bus interface unit 12-200. The sequencer 12-202 includes logic circuits for generating signals for conditioning an address generator 12-202. The generator 12-202 includes circuits in either RAM or PROM form for generating branch vector addresses.

As seen from FIG. 1, the address generator 12-202 and control sequencer 12-204 connect to the control, address and data lines of bidirectional bus 12-6, as shown. The bus 12-6 is operated according to a predefined protocol or dialog for transferring commands, address and data between chips 12-2 and 12-4 in addition to system bus 14. The bus 12-6 also provides a facility by which interface chip 12-2 can write and read the contents of an internal register of chip 12-4 which connects to bus 12-6. This is done through the use of read and write port commands. For an example of this type of bus arrangement, reference may be made to U.S. Pat. No. 4,910,666 which issued on Mar. 20, 1990.

The microprocessor 12-4 performs the function of executing procedures as required for performing general processing operations, in addition to executing procedures specified by the vector branch addresses generated by chip 12-2 in response to external requests or events. In the preferred embodiment, the microprocessor 12-4 takes the form of a high performance reduced instruction set (RISC) microprocessor chip which includes on-chip instruction and data caches for minimizing access delays. For example, one such chip is the Intel i860 microprocessor.

As seen from FIG. 1, microprocessor chip 12-4 includes a 32-bit branch vector register 12-400 which connects to bus 12-6 so as to be capable of being read and written by interface chip 12-2. Additionally, the register 12-400 operatively connects to an instruction cache 12-402. Register 12-400 has associated therewith read and write indicators which are set to appropriate states for signaling when a read or write has taken place within register 12-400.

As explained herein, the read indicator is set to an active state by the RISC chip 12-4 in the same way any conventional indicator bit is set in response to accessing the contents of a register or register file. The output from the read indicator of register 12-400 is used to generate an external vector accessed signal which via bus 12-6 is applied as an input to the control sequencer 12-204, as shown. The write indicator is set in response to a bus write strobe signal applied to a control line of bus 12-6 when the register is written into by the interface chip 12-2. Additionally, control sequencer 12-204 connects to an interrupt control line of bus 12-6 which connects as an input to the interrupt facilities of microprocessor chip 12-4.

Instruction cache 12-402 is used to store all of the procedures executed by the chip 12-4. Microprocessor chip 12-4 also includes a data cache 12-404 for storing data and other information fetched in response to the procedure instructions. Microprocessor chip 12-4 further includes a register file, an arithmetic and logic unit and instruction decode and control unit connected, as shown, which are included as part of a RISC core block 12-406.

For further information regarding the construction of a microprocessor which is similar to the microprocessor chip 12-4, reference may be made to the article titled, "Introducing the Intel i860 64-Bit Microprocessor," published in the August, 1989 issue of IEEE MICRO.

DESCRIPTION OF OPERATION

Figure 2:
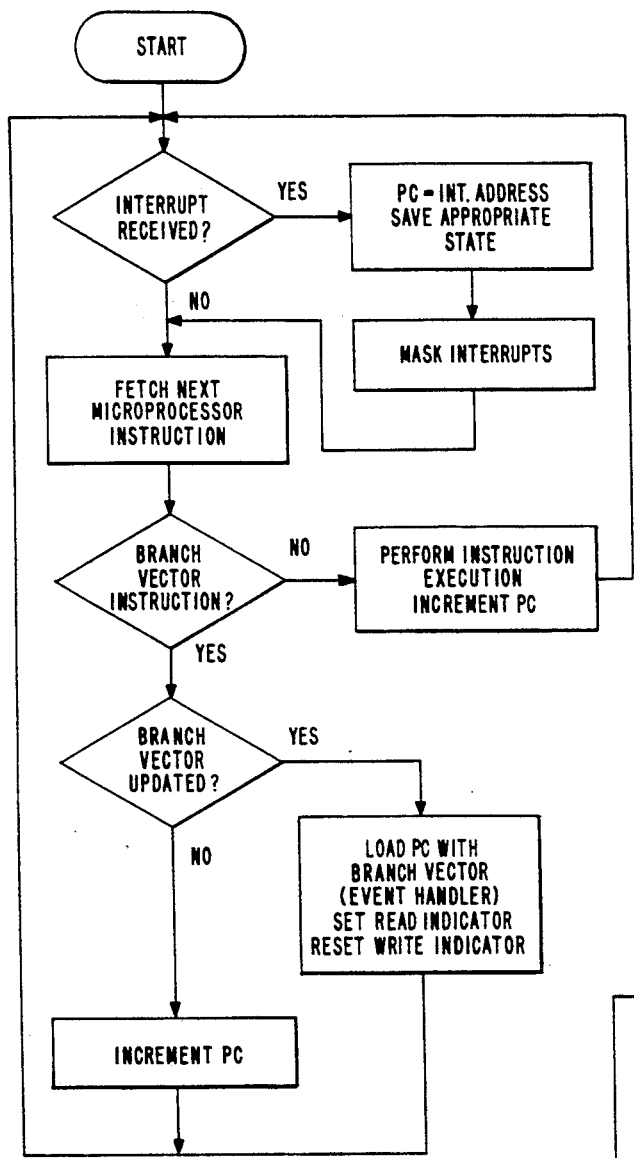
FIGS. 2 through 6 are flow diagrams used to explain the operation of the apparatus of FIG. 1.

With reference to FIG. 1 and the flow diagrams of FIGS. 2 through 6, the operation of the system of the preferred embodiment will now be described. FIG. 2 illustrates the operation of the apparatus of the present invention. As shown, when the instruction decode and control unit of block 12-406 detects an interrupt condition, it causes the program counter (PC) to be loaded with an interrupt address, in addition to saving the contents of pertinent registers. It then performs a masking operation on the contents of the interrupt register for disabling further interrupts.

In the absence of an interrupt condition, microprocessor chip 12-4 fetches the next instruction of a procedure. It decodes the instruction. When the instruction is not a branch vector instruction, chip 12-4 executes the instruction and increments its program counter by one for fetching the next instruction. When the instruction is a branch vector instruction, chip 12-4 tests the contents of the vector register to determine if it had been updated. As mentioned previously, this is done by testing the state of the associated write indicator to determine if the register has been written or updated by chip 12-2.

If the register contents have not been updated (i.e., the write indicator is still a ZERO), chip 12-4 increments its program counter. If the register contents have been updated, chip 12-4 branches to the procedure instruction specified by the contents of the vector register by loading the contents into its program counter as shown in FIG. 2. In this manner, the chip 12-4 does not have to perform any off-chip accesses for vector branch values, thereby reducing the time of instruction processing.

Figure 3:
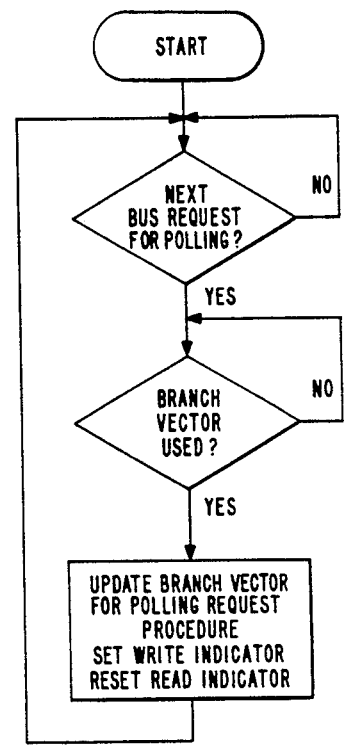

The operation of the apparatus will now be described in greater detail relative to performing polling and interrupt operations. FIG. 3 shows the operation of interface chip 12-2 in processing requests received from system bus 14 utilizing polling. As shown, when a request is received and the read indicator is set to an active state, this causes sequencer 12-204 to read out an address. The address is applied to control store 12-202 which causes the read out of branch vector address. The branch vector address is transferred via bus 12-6 using the standard protocol and loaded into branch vector register 12-400 of chip 12-4. This, in turn, causes chip 12-4 to fetch instructions from the specified procedure within instruction cache 12-402.

Figure 4:
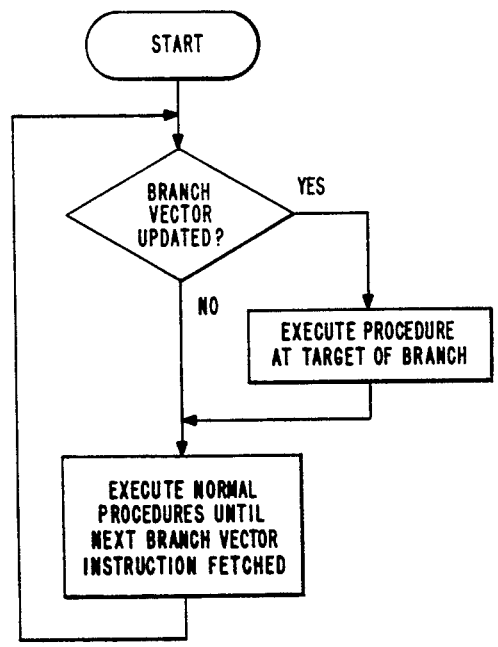

Referring to FIG. 4, it is seen that each time RISC chip 12-4 performs a polling operation by executing a branch vector instruction, it tests the contents of the vector register 12-400 to determine if it had been updated. As mentioned previously, this is done by testing the state of the associated write indicator to determine if the register has been written or updated by interface chip 12-2.

If the register contents have not been updated (i.e., the write indicator is still a ZERO), chip 12-4 then executes instructions within the procedure under execution until the next branch vector instruction is fetched. When the register contents have been updated, chip 12-4 branches to the procedure, such as an event handler, specified by the contents of the vector register 12-400 by loading the contents into its program counter as shown in FIG. 4. This enables chip 12-4 to carry out those operations required in servicing the external request or event. In this manner, the chip 12-4 does not have to perform any off-chip accesses for vector branch values in switching from one type of procedure to another, thereby reducing the time of instruction processing.

As previously mentioned, the apparatus of the present invention may be employed in various types of systems, such as that disclosed in the related application, as well as in the handling of service requests having different levels of priority, such as interrupt requests using the standard interrupt facilities included within RISC microprocessor chip 12-4.

Figure 5:
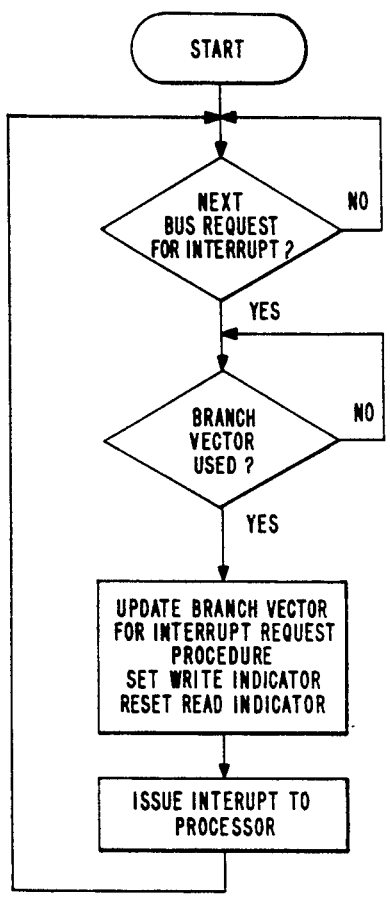
Figure 6:
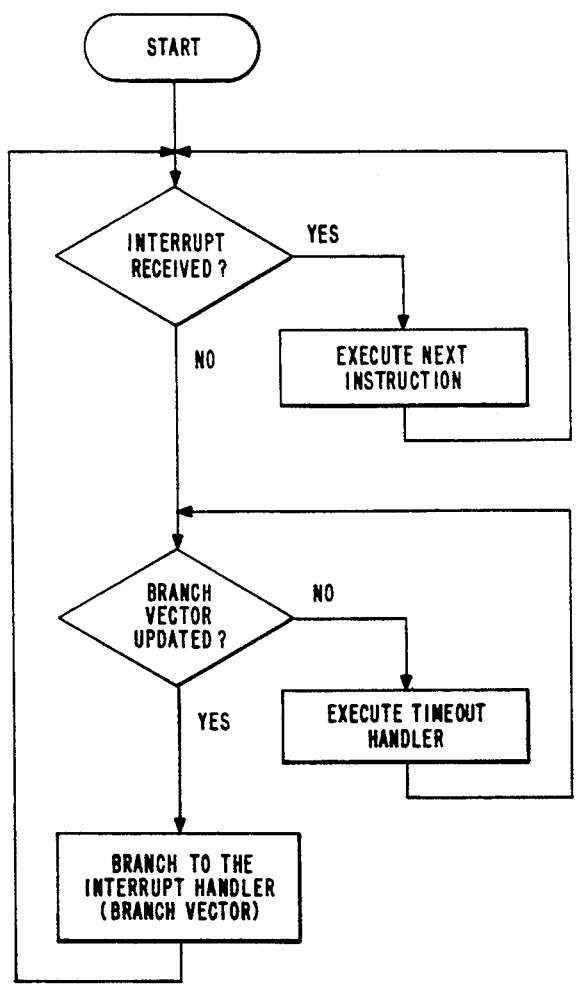

FIGS. 5 and 6 illustrate the operation of chip 12-4 in servicing requests or events through an interrupt mechanism employing the apparatus of the present invention. As seen from FIG. 5, interface chip 12-2 determines if the request received from system bus 18 is the type of request which requires the generation of an interrupt. If it does, control sequencer 12-204 performs a sequence of operations of FIG. 5 which include causing address generator 12-202 to generate a vector address including level information coded for specifying the type and priority of the request. This information is applied to bus 12-6 only when the read indicator is set to an active state indicating that the prior branch vector address has been used by chip 12-4. Also, the write indicator is set to an active state via a write strobe signal applied to bus 12-6. This is followed by control sequencer 12-204 forcing the interrupt line to an active state.

As seen from FIG. 6, microprocessor chip 12-4, following the execution of each procedure RISC instruction, tests the state of its internal interrupt indicator. Since it was set, microprocessor chip 12-4 branches to an interrupt address and fetches as one of the instructions, a branch instruction which specifies the use of the branch vector register as a pointer to a specific interrupt handler procedure. Chip 12-4 then tests the state of the write indicator. Since it is in an active state, microprocessor chip 12-4 branches to the specific interrupt handler procedure for processing the event. It will be noted that when the write indicator is not set to an active state, such as in the case of an error or fault condition, the microprocessor chip 12-4 executes a time out handler procedure wherein the microprocessor chip generates a time out after the elapse of a predetermined time period as indicated in FIG. 6.

The use of priority and level information as part of the branch vector address reduces overhead in that microprocessor chip 12-4 is caused to branch directly to the specific procedure for handling that type of interrupt request. For an example of a system which classifies events, reference may be made to U.S. Pat. No. 4,006,466, issued on Feb. 1, 1977.

While the i860 chip was indicated for implementing chip 12-4, it was selected because of it having on-chip instruction and data caches. It will be obvious that other high performance chips could also be used, such as the R3000 and successor chips manufactured by MIPS Corporation.

It will be obvious to those skilled in the art that many changes may be made to the preferred embodiment of the present invention without departing from its teachings. For example, different chips, different instruction sets and different bus protocols may be used. Other changes will be readily apparent to those skilled in the art.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A system for processing requests received from a system bus, said system comprising:

an interface chip including vector address generation means coupled to said system bus for receiving requests, said vector address generation means in response to a predetermined type of request generating a branch vector address;

a microprocessor chip including:

an instruction cache for storing instructions including branch vector instructions, of a number of procedures fetched from said system bus as required for executing processing operations for handling the requests;

a branch vector register for storing said branch vector address;

a read indicator and a write indicator associated with said register;

bidirectional bus interconnecting said interface chip address generation means and microprocessor chip register and read/write indicators the read indicator and the write indicator for transferring of information between said chips using a standard protocol; and, said microprocessor chip further including instruction decode and control means operatively coupled to said branch vector register and to said read indicator and said write indicator said microprocessor instruction decode and control means upon detecting a branch vector instruction in a procedure under execution specifying said vector register as a source of a branch address, being operative to test said write indicator for causing said microprocessor chip to branch to one of said number of procedures specified by said branch vector address when said write indicator is in an active state for processing said predetermined type of request and said microprocessor chip switching said read indicator to an active state upon having processed the request signaling said interface chip through said bidirectional bus that said interface chip can transfer to a new vector address through said bidirectional bus for processing another predetermined type of request.

2. The system of claim 1 wherein execution of said branch vector instruction causes said microprocessor chip to poll for system bus request by testing said write indicator said microprocessor chip in an absence of said write indicator being set to said active state, continues executing instructions of said procedure until a next branch vector instruction is fetched.

3. The system of claim 1 wherein each of said plurality number of procedures include a number of reduced instruction set (RISC) type of instructions and wherein said branch vector instruction is a RISC type of instruction.

4. The system of claim 1 wherein said instruction cache is located on said microprocessor chip and said microprocessor chip is a RISC type chip.

5. The system of claim 1 wherein said address generator generation means of said interface chip includes a control sequencer and an address generator circuit, said control sequencer being connected to said bidirectional bus and to said system bus and said address generator circuit being connected to said control sequencer and to said bidirectional bus, said control sequencer in response to said predetermined type of request causing said address generator circuit to generate and transfer said branch vector address to said microprocessor chip through said bidirectional bus when said read indicator is in said active state.

6. A system for processing requests or events received from a system bus, said system comprising:
   an interface chip including vector address generation means coupled to said system bus for receiving requests, said address generation means in response to a predetermined type of request generating an interrupt signal indicative of an interrupt condition and a branch vector address;
   a microprocessor chip including:
      an instruction cache for storing instructions including branch vector instructions, of a number of procedures fetched from said system bus as required for executing processing operations for handling the requests;
      a branch vector register for storing said branch vector address;
      a read indicator and a write indicator associated with said register;
      bidirectional bus interconnecting said interface chip address generation means and microprocessor chip register and the read indicator and the write indicator for transferring of information between said chips using a standard protocol; and,
   said microprocessor chip further including instruction decode and control means operatively coupled to said register and to said read indicator and said write indicator said instruction decode and control means further including interrupt processing means connected to said system bus for receiving said interrupt signal from said interface chip, said instruction decode and control means upon detecting an interrupt condition, testing said write indicator and causing said microprocessor chip to branch to one of said number of procedures specified by said branch vector address for servicing said interrupt condition when said write indicator is in an active state, said microprocessor chip switching said read indicator to an active state upon having processed said predetermined type of request signaling said interface chip through said bidirectional bus that said interface chip can transfer a new branch vector interrupt address through said bidirectional bus for processing another predetermined type of request.

7. The system of claim 6 wherein said branch vector interrupt address used to process said interrupt condition is coded to include information specifying the type and priority level of said interrupt condition for causing said branch to one of a number of handlers specially designed to handle the interrupt condition so as to reduce overhead.

8. The system of claim 6 wherein each of said number of procedures include a number of reduced instruction set (RISC) type of instructions.

9. The system of claim 6 wherein said instruction cache is located on said microprocessor chip and said microprocessor chip is a RISC type chip.

10. The system of claim 6 wherein said address generator means of said interface chip includes a control sequencer and an address generator circuit, said control sequencer being connected to said bidirectional bus and to said system bus for transferring said interrupt signal and receiving said requests, respectively, and said address generator circuit being connected to said control sequencer and to said bidirectional bus, said control sequencer in response to said predetermined type of request causing said address generator circuit to generate and transfer said branch vector interrupt address to said interrupt signal to said microprocessor chip through said bidirectional bus when said read indicator is in said active state.

11. A method of organizing a system including a microprocessor chip for operating under the control of external invocation apparatus, said method comprising the steps of:
   (a) including a branch vector register and associated read indicator and write indicator within said microprocessor chip for storing a branch vector address and read/write indications;
   (b) including vector address generation means within an interface chip and coupling said vector address generation means to a system bus for receiving requests to be processed by said microprocessor chip through a number of procedures, one or more of said number of procedures having a branch vector instruction;
   (c) connecting a bidirectional bus to said branch vector register and associated said associated read indicator and write indicator within said microprocessor chip and to said vector address generation means within said interface chip for transferring information therebetween through a standard protocol;
   (d) connecting said vector address generation means to said system bus for generating said branch vector address in response to a request from said system bus to be transferred to said vector register; and,
   (e) connecting said microprocessor chip to said write indicator for testing and to enable a branch to a procedure for processing said request which is specified by said vector address transferred to said branch vector register each time a branch vector instruction is fetched from one of said number of procedures and executed by said microprocessor chip when said write indicator is in an active state.

12. The method of claim 11 wherein said method further includes the steps of:
   (f) connecting said microprocessor chip to said read indicator for setting said read indicator to an active state for signaling said interface chip that said vector register has been accessed by said microprocessor chip for enabling transfer of a next vector address by said interface chip for processing another request.

13. A method of organizing a system including a microprocessor chip for operating said microprocessor chip under the control of external invocation apparatus, said method comprising the steps of:
   (a) including within the microprocessor chip, a branch vector register for storing a branch vector interrupt address and associated read indicator and write indicator;

(b) including within an interface chip, vector address generation means and coupling said generation means to a system bus for receiving requests;

(c) connecting a bidirectional bus to said branch vector register and said associated read indicator and write indicator of said microprocessor chip and to said vector address generation means of said interface chip for transferring information therebetween through a standard protocol;

(d) connecting said generation means to transfer on said bidirectional bus to said vector register, each branch vector interrupt address generated by said generation means in response to a request from said system bus requiring interrupt processing;

(e) connecting said interface chip for setting an interrupt within said microprocessor chip through said bidirectional bus; and, (f) connecting said microprocessor chip for branching to a procedure specified by the branch vector interrupt address each time said interrupt is acted on when said write indicator is in an active state, to execute instructions of a handler routine for processing said request.

14. The method of claim 13 wherein said method further includes the step of:

(g) said microprocessor chip setting said read indicator to an active state for signaling said interface chip that said vector register has been accessed for enabling transfer of a new vector interrupt address by said interface chip for processing another request.

* * * * *